US008116787B1

(12) United States Patent
Lektuai

(10) Patent No.: US 8,116,787 B1
(45) Date of Patent: Feb. 14, 2012

(54) WIRELESS NETWORK COVERAGE BASED ON QUALITY OF SERVICE

(75) Inventor: Gaviphat Lektuai, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 546 days.

(21) Appl. No.: 11/428,256

(22) Filed: Jun. 30, 2006

(51) Int. Cl.

| | |
|---|---|
| ***H04W 74/00*** | (2009.01) |
| ***H04W 4/00*** | (2009.01) |
| ***H04B 1/16*** | (2006.01) |
| ***H04B 7/216*** | (2006.01) |
| ***H04B 7/212*** | (2006.01) |
| ***H04M 3/42*** | (2006.01) |
| ***H04M 1/00*** | (2006.01) |
| ***H04L 12/50*** | (2006.01) |

(52) U.S. Cl. ............... 455/456.2; 455/435.2; 455/456.1; 455/552.1; 455/414.2; 370/388; 370/342; 370/347; 370/331

(58) Field of Classification Search ............... 455/456.2, 455/435.2, 456.1, 552.1, 414.2; 370/338, 370/342, 347, 331
See application file for complete search history.

(56) References Cited

U.S. PATENT DOCUMENTS 5,657,487 A * 8/1997 Doner ........................ 455/456.2
6,169,898 B1 * 1/2001 Hsu et al. ................... 455/432.3
6,377,804 B1 * 4/2002 Lintulampi ................ 455/435.2
6,633,768 B2 * 10/2003 Hurme et al. ................. 455/565
6,850,764 B1 * 2/2005 Patel ............................ 455/450
7,043,225 B1 * 5/2006 Patel et al. .................... 455/405
2002/0090956 A1 * 7/2002 Otsuka et al. ................. 455/456
2002/0128017 A1 * 9/2002 Virtanen ....................... 455/452
2003/0036379 A1 * 2/2003 Nikolai et al. ................ 455/414
2003/0115310 A1 * 6/2003 Klotsche ....................... 709/223
2003/0220835 A1 * 11/2003 Barnes, Jr. ....................... 705/14
2005/0192024 A1 * 9/2005 Sheynblat .................. 455/456.1
2005/0272472 A1 12/2005 Goldberg et al.

* cited by examiner

*Primary Examiner* — Dwayne Bost
*Assistant Examiner* — Ariel Balaoing
(74) *Attorney, Agent, or Firm* — Parks IP Law LLC; Mickki D. Murray, Esq.

(57) ABSTRACT

Coverage-based quality-of-service (QoS) in wireless networks. A premium QoS service is provided by the network to users who qualify to receive QoS signals by moving handsets into a bounded premium service geographical coverage area. A mobile handset periodically transmits handset lat-long data to the wireless network via a control channel. The network includes data that defines the bounded geographical coverage area. The wireless network receives the handset lat-long data and maps the data to coverage area data. If the handset lat-long data maps into the coverage area data, the user handset is authorized to receive and use the premium QoS signals over a 3G network; otherwise, the user falls back to default service on a 2G network. Alternatively, the network utilizes a trained neural network to process the lat-long data to qualify the handset for premium services.

10 Claims, 11 Drawing Sheets

200
114 SERVICE COMPONENT
212 QoS COVERAGE SERVICE
108 MAPPING COMPONENT
206
208
AREA A
118 CELLULAR NETWORK
214
204
3G
2G
106
106
202 LAT-LONG
ANTENNA
210
AREA A
ANTENNA

WIRELESS NETWORK COVERAGE BASED ON QUALITY OF SERVICE

TECHNICAL FIELD

This invention relates to wireless communication systems, and more specifically, to quality-of-service (QoS) in wireless networks.

BACKGROUND

Mobile telephone networks provide a variety of services and functions beyond simple direct voice communication. Once scarce and expensive, mobile communication devices are now so common that many people own at least one. Accordingly, cellular telephone manufactures and operators strive to continually provide new and innovative services in an attempt to keep existing customers and draw in new customers in an industry that is very competitive.

GPRS (General Packet Radio Service) and UMTS (Universal Mobile Telecommunications System) standards provide a way of establishing data connectivity between mobile devices. For a GPRS network, the allowed QoS (quality-of-service) is usually pre-provisioned on a per-subscription basis and is fixed, since there is limited QoS support available. On the other hand, UMTS network services are much more flexible in terms of QoS by providing at least four types of traffic that include a conversational class (e.g., voice, video telephony, video gaming), a streaming class (e.g., multimedia, video on demand, webcast), interactive class (e.g., web browsing, network gaming, database access), and background class (e.g., email, SMS-short message service, downloading).

However, there is no commercial QoS service for directing WWAN (wireless wide area network) service to a selected bounded area. Moreover, there is no partition capability of coverage. Conventionally, the service coverage is either on or off for the whole sector. Use can be made of narrow beam antennas or repeaters to focus on one particular area, but this is not QoS-based and coverage cannot be confined to a bounded area.

SUMMARY

The following presents a simplified summary in order to provide a basic understanding of some aspects of the disclosed innovation. This summary is not an extensive overview, and it is not intended to identify key/critical elements or to delineate the scope thereof. Its purpose is to present some concepts in a simplified form as a prelude to the more detailed description that is presented later.

The disclosed architecture provides an alternative QoS solution based on selected geographical coverage, rather than a network subscriber's SIM (subscriber identity module) and/or phone specific setting(s). In accordance with a novel aspect, a premium (or QoS) service is reserved by the network to one or more users who qualify to receive the QoS signals by moving into a defined or bounded premium service geographical coverage area.

In one implementation, a mobile handset includes a receiver (e.g., a GPS-global positioning system) to acquire latitude and longitude (or "lat-long") location information, and then periodically transmits the lat-long data to the cellular network via a control channel. The network includes a datastore of information associated with coordinates that define the bounded geographical coverage area. The cellular network acknowledges receipt of the handset location information and maps the location information to a database containing data of specific geographical coverage area(s). If the user's location information is within the mapping area, the user handset is authorized to receive and use the premium QoS signals; otherwise, the user falls back to a default service.

The premium service QoS signals are provided via a 3G network (e.g., UMTS), while the default service is provided on a 2G network. Accordingly, when the user qualifies for the QoS coverage by moving the mobile handset into the geographical coverage area, the premium services is provided over the 3G network. Contrariwise, when the user moves the handset out of the geographical coverage area, the lat-long information transmitted to the network no longer maps to the geographical coverage area. The user no longer qualifies for the premium QoS signals, and hence, is controlled to move back to communications and services of the 2G network.

In an alternative mapping implementation, the network utilizes a trained neural network that receives the lat-long information as input, and basically outputs values that indicate "qualified for coverage" or "not qualified for coverage".

In support thereof, disclosed and claimed in one aspect thereof is a system that facilitates mobile communications. The system includes a location component for generating geolocation information of a mobile handset, a mapping component for mapping the geolocation information to data associated with a bounded service area, and a service component that manages communication of quality-of-service (QoS) signals based on results of the mapping. The location component can be an external system that facilitates computation of the handset location information for periodic communication to the cellular network. Alternatively, or in combination therewith, the location component can be an internal system (e.g., a GPS receiver) that receives geolocation data (e.g., lat-long) and periodically communicates the lat-long data to the cellular network.

In yet another implementation, not only is the handset lat-long data utilized, but device information and/or user preference information as well.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
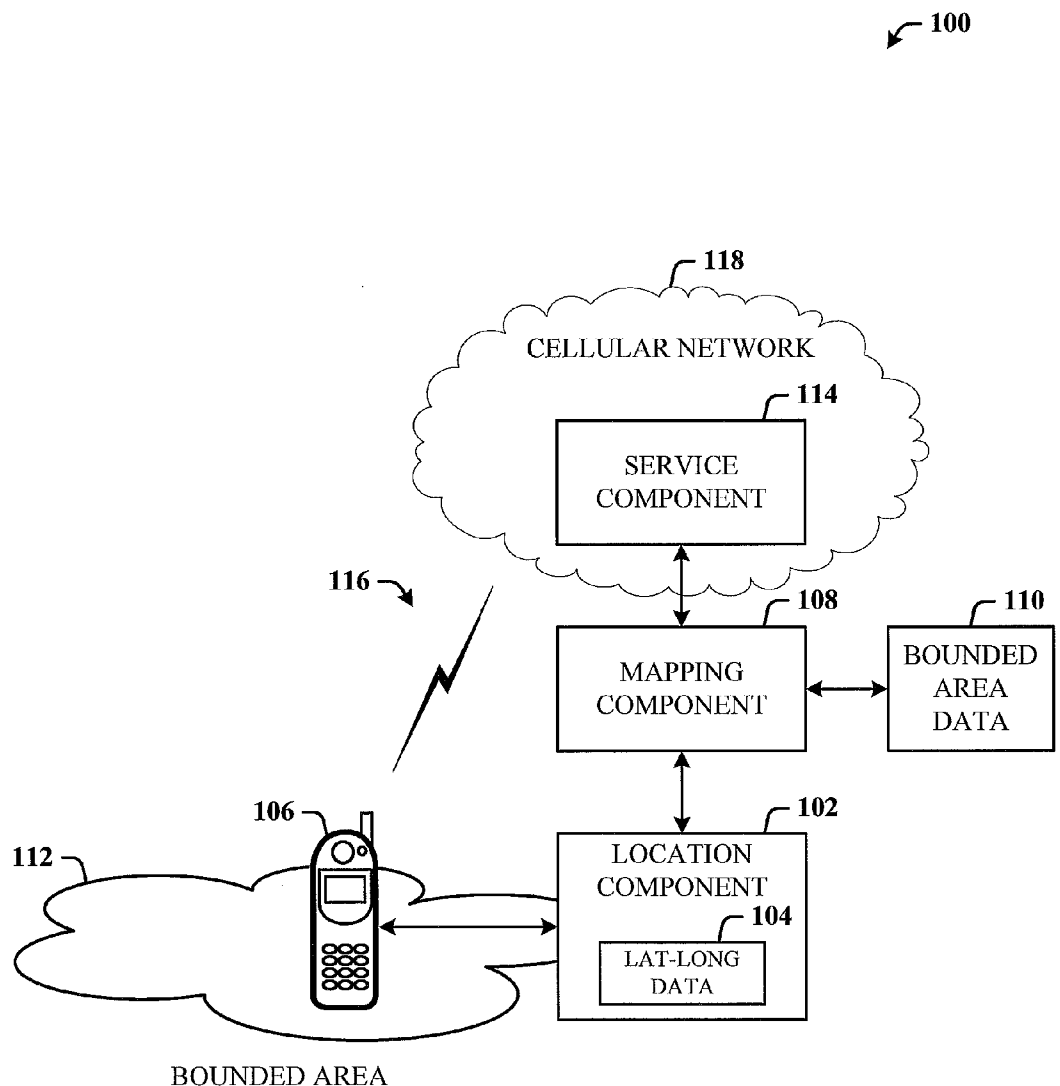
FIG. 1 illustrates a system that facilitates coverage-based QoS mobile communications.

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

The disclosed innovative architecture is a coverage-based quality-of-service (QoS) in cellular networks. A premium QoS service is provided by the network to users who qualify to receive QoS signals by moving handsets into a bounded premium service geographical coverage area. The mobile handset periodically transmits lat-long data to the cellular network via a control channel. The network includes data that defines the bounded geographical coverage area. The cellular network receives the handset lat-long data and maps the data to coverage area data. If the handset lat-long data maps into the coverage area data, the user handset is authorized to receive and use the premium QoS signals over a 3G network; otherwise, the user falls back to default service on a 2G network. Alternatively, the network utilizes a trained neural network to process the lat-long data to qualify the handset for premium services.

The innovation is now described with reference to the drawings, wherein like reference numerals are used to refer to like elements throughout.

FIG. 1 illustrates a system 100 that facilitates coverage-based QoS mobile communications. The system 100 includes a location component 102 for generating geolocation information (e.g., lat-long data) 104 associated with a mobile handset 106, a mapping component 108 for mapping the geolocation information to bounded area data 110 associated with a bounded service area 112, and a service component 114 that manages communication of quality-of-service (QoS) signals 116 based on results of the mapping. The location component 102 can be an external system that facilitates computation of the handset geolocation information 104 for periodic communication to a cellular network 118. Alternatively, or in combination therewith, the location component 102 can be an internal system (e.g., a GPS receiver) of the handset 106 that receives geolocation data (e.g., lat-long) and periodically communicates the lat-long data to the cellular network 118.

In a 3G UMTS (Universal Mobile Telecommunications System) network, the number of subscribers can affect network performance, especially throughput. Thus, by focusing the 3G resources to a specified geographic area for an event (e.g., convention, meeting, . . . ) for qualified users, this can eliminate the out-of-coverage QoS users (who fall back to a 2G or EDGE (enhanced data for GSM evolution) cellular network during this period), thereby, effectively improving in-coverage user performance. The disclosed wireless coverage-based QoS does not require users to register information to be able to use the premium QoS service, such as conventional QoS which can require a service agreement between the subscriber and operator.

The location component 102 facilitates the computation and utilization of geolocation information associated with the handset 106. Location-based services enable personalized services to be offered based on a person's (or item of the person) location. Location technologies can be classified into at least three categories, including stand-alone, satellite-based, and terrestrial-based. A stand-alone system need not rely on multiple range measurements to determine the caller's position, but can attempt to provide the location based on power level, for example. Satellite-based systems such as Global Positioning System (GPS) provide very good accuracy and availability. GPS in combination with other systems (e.g., assisted GPS), can be employed where line-of-sight may impact regular GPS in urban canyons and inside buildings.

Assisted GPS (A-GPS) is a technology where resources other than a satellite constellation, such as a fixed assistance server and reference network, assist a GPS receiver to calculate its position. A-GPS is useful in urban areas, when the user is located in urban canyons, under heavy tree cover, structures or even indoors. The assistance server removes some of the tasks that the GPS receiver would normally perform by facilitating precise GPS satellite orbit and clock information, initial position and time estimates. This information can be computed by the assistance server and communicated to the receiver through the mobile network using, for example, SMS, or other messaging services.

Terrestrial-based systems can use existing cellular network base station transceivers (BTS's) for ground-based communications. The BTS transmits multiple ranging signals for a mobile station (or cell phone) in order to determine its location. BTS can be added based upon the density of people residing in a certain geographic area. Consequently, more BTS exist in an area of higher population density than in an area of lower population density, which is optimized for communications purposes, and not for location services.

One method of determining the location of a wireless caller via a terrestrial-based system is by time difference of arrival (TDOA) technology. The TDOA technique works based on trilateration by measuring the time of arrival of a mobile station radio signal at three or more separate cell sites. Accordingly, in one implementation, the location component 102 utilizes TDOA to determine geolocation information associated with the handset. In another implementation, the location component 102 utilizes handset power levels to compute the location information. In yet another implementation, the location component 102 employs GPS to provide the lat-long information that is periodically transmitted to the cellular network for mapping. Still further, other triangulation techniques can be employed as a means for finding the handset geolocation data for mapping.

As indicated, the mapping component 108 can map handset geolocation information via a table search and lookup approach in a database of tables of premium coverage area data. Alternatively, or in combination therewith, a neural network can be employed. Accordingly, the neural network can be trained with sets of parameters of equations to map the bounded QoS coverage area, until a targeted mean square error is reached. The final trained parameters are then used as sets of equations, for example. Simple user inputs can be latitude and longitude, and the output will be the classification of in-coverage or out-of-coverage users. The neural network mapping equations approach can provide faster classification of users that qualify for the QoS coverage than the common database search and lookup method.

In support of coverage-based QoS, a coverage area can be partitioned into one small area or several small service areas. No additional cost is required in conventional systems in equipment. The creation adds potential business customers without extra cost to the network by, for example, providing a service in the gaming convention center where people can play live online battles with sufficient bandwidths and quality performance. Alternatively, it can be used for live video shares between two selected QoS college campuses for educational purposes, and for conventions, meetings, conferences, etc.

In one implementation, it may require modification to the control channel protocol to include location information to the network. Alternatively, the handset geolocation information can be transmitted to the network using an SMS (short message service) or MMS (multimedia messaging service) channel.

Figure 2:
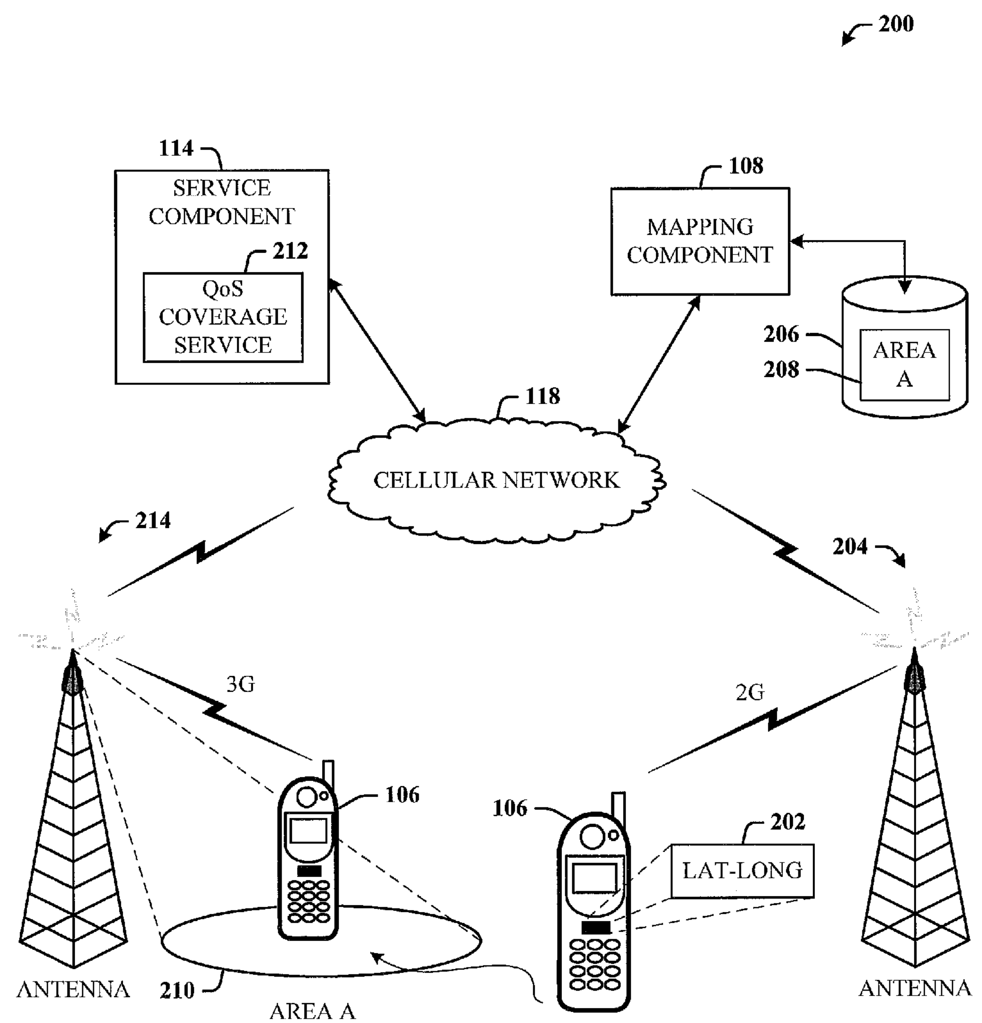
FIG. 2 illustrates a more detailed block diagram of one exemplary system of coverage-based QoS in accordance with the subject innovation.

FIG. 2 illustrates a more detailed block diagram of one exemplary system 200 of coverage-based QoS in accordance with the subject innovation. Here, the system 200 employs the location component 102 of FIG. 1 as part of the handset 106. When the handset 106 receives and/or generates lat-long data 202, the data 202 is periodically communicated (e.g., via SMS) to a first cell site 204 of the cellular network 118. The mapping component 108 receives the data 202 and processes it against a database 206 that includes network-defined coverage data 208 associated with the coverage area 210 (denoted AREA A) and a coverage-based QoS 212, as managed by the service component 114.

As long as the handset 106 is outside of the premium service coverage area 210, the data 202 will not map to the coverage data 208. Thus, the service component 114 prevents the handset 106 from obtaining premium services from the first cell site 204; the handset 106 will continue to (or only) receive 2G services from the cell site 204. It is to be understood that the handset 106 can also receive 3G services from the first cell site 204 even though the handset 106 is outside the coverage area 210, however, it will not receive the premium coverage-based QoS 212 associated with the coverage area 210.

Once the handset user brings the handset 106 into the coverage area 210, the transmitted lat-long data 202 will include geolocation information that maps to the coverage data 208 in the database 206. Accordingly, the service component 114 automatically (and transparently to the handset user) facilitates receipt of the coverage-based QoS 212 by the handset 106 via a second cell site 214 that provides the 3G services antenna coverage to the area 210.

It is to be appreciated, however, that it is not a requirement that the two cell sites (204 and 214) be utilized. A single cell site (e.g., the second cell site 214) can also provide 2G services to the handset 106 whether the handset 106 is outside of the coverage area 210 or in the coverage area 210. Additionally, the second cell site 214 can also provide 3G services to the handset 106 whether the handset 106 is inside or outside of the coverage area 210; however, if outside, the 3G service is not the QoS coverage service 212, but a lower level 3G service.

It is within contemplation of the subject invention that once the lat-long data 202 maps to the coverage data 208, this successful mapping can trigger other processes to initiate. For example, the handset 106 can be configured to provide (received from the network 118 or generated locally) a notification (e.g., text, multimedia, an image, a short video clip, audio signals such as a ring tone) to the user that the handset 106 is now capable of receiving via the QoS 212. The notification can include different types of content such as event information, reminders, and carrier information, for example.

Figure 3:
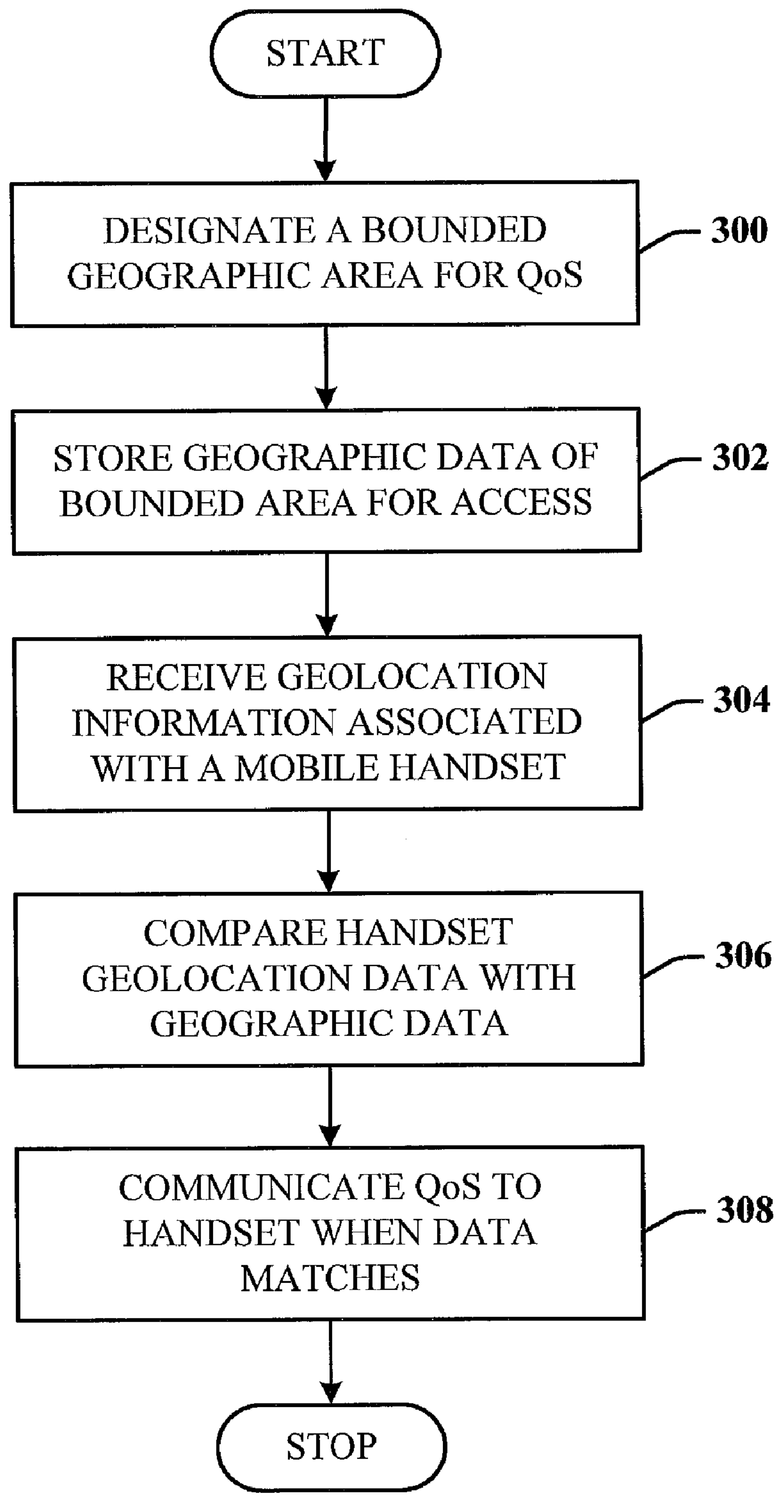
FIG. 3 illustrates a methodology of providing coverage-based QoS in accordance with a novel aspect.

FIG. 3 illustrates a methodology of providing coverage-based QoS in accordance with a novel aspect. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 300, a bounded geographic area is designated in data for the premium QoS. At 302, the bounded area data is stored for access (e.g., in a database or as a neural network). At 304, geolocation information associated with the geographic location of the handset is received. At 306, the handset geolocation data is compared (or mapped) to the bounded area data. At 308, if a successful comparison (or match), the premium QoS is allowed to be received by the handset. As indicated supra, in one implementation, any handset entering the bounded coverage area can automatically receive the premium service. In an alternative implementation, the handset will need to register and be processed through the AAA (authentication, authorization and accounting) management and security framework and/or other cellular network services before being allowed to receive the premium service.

Figure 4:
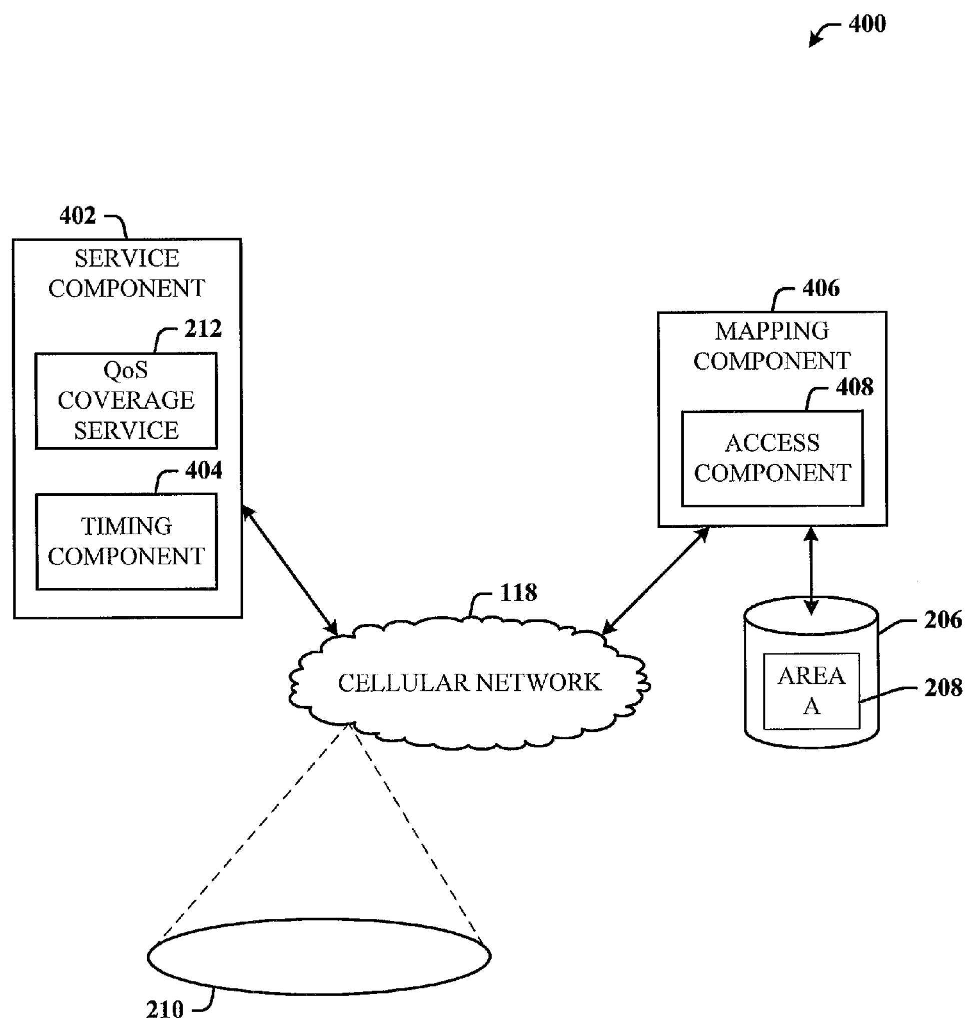
FIG. 4 illustrates a more detailed alternative implementation for managing the coverage-based QoS using a table lookup approach.

Referring now to FIG. 4, there is illustrated a more detailed alternative implementation for managing the coverage-based QoS using a table lookup approach. The duration of the coverage-based QoS can be managed. For example, the premium service can be controlled to turn on and off at predetermined times, thus, restricting the service 212 as desired. In support thereof, an alternative system 400 includes a service component 402 for providing the QoS coverage service 212, as before. Additionally, the service component 402 can include a (or be associated with an external) timing component 404 that controls the duration of the service 212 over the coverage area 210. Timing information can be described in the timing component 404 in terms of hours, days, weeks, etc. Moreover, the premium service can be enabled/disabled multiple times over a period of hours for example, for whatever purposes desired.

Service 212 to the coverage area 210 can be controlled in at least one other way. The mapping process can be controlled by removing data at a designated location in the database 206. In other words, a mapping component 406 can include an access component 408 that manages access to the coverage data 208. Thus, by automatically placing the data 208 into the appropriate database location, the cellular network 118 and related equipment (not shown) automatically configure and enable the service 212 over the coverage area 210. Access control can include changes to access rights to the data location, for example, or by employing other conventional data access and management methodologies. It is also to be appreciated that the timing component functions and the access component functions can be performed in combination, as desired.

Figure 5:
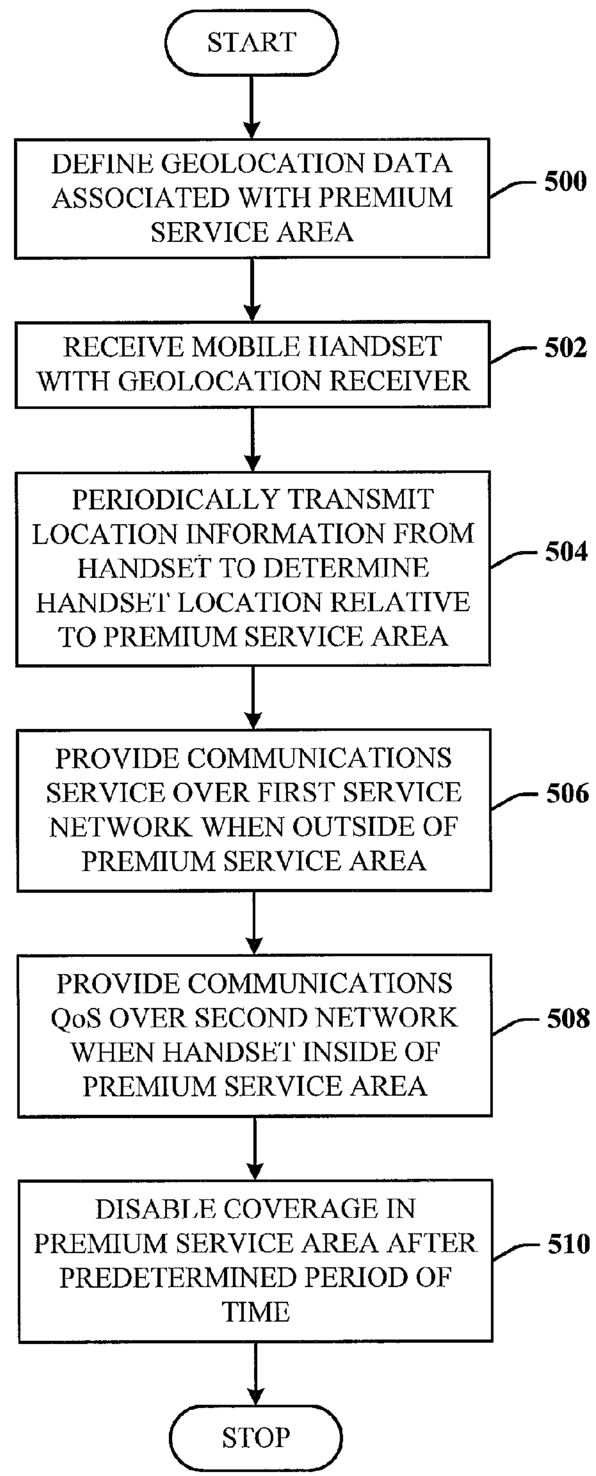
FIG. 5 illustrates a methodology of proving coverage-based QoS based on time.

FIG. 5 illustrates a methodology of providing coverage-based QoS based on time. At 500, geolocation data associated with a premium service area is defined. At 502, a mobile handset having a geolocation receiver is received. At 504, the handset periodically transmits the geolocation information to the network for determining the handset location relative to the premium service area. At 506, communications service is provided over a first service network (e.g., 2G or GPRS) when the handset out-of-coverage of the premium service area. At 508, the premium service is provided over a second network (e.g., 3G, 4G, . . . ) when the handset is within the premium service area. At 510, premium service coverage is disabled after a predetermined period of time.

Figure 6:
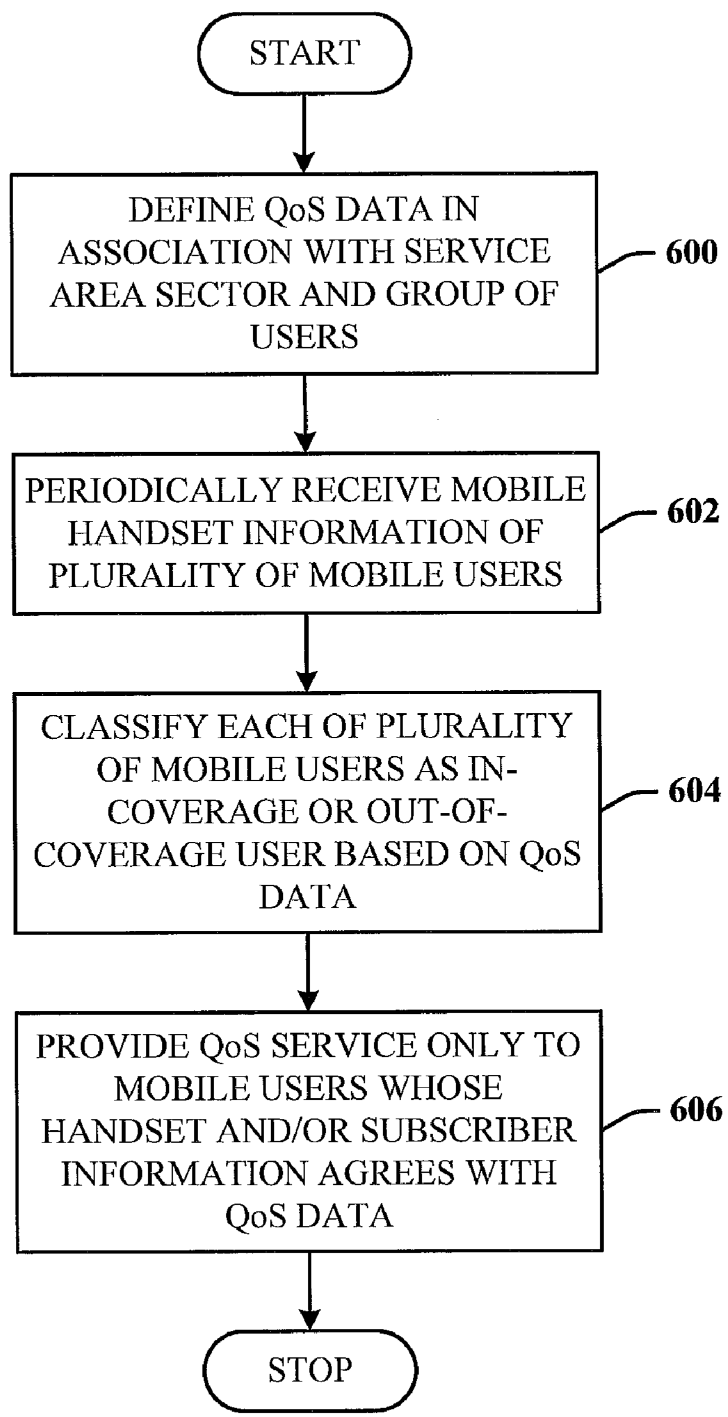
FIG. 6 illustrates a methodology of providing premium QoS signals based on other subscriber information.

Referring now to FIG. 6, there is illustrated a methodology of providing premium QoS signals based on other subscriber information. At 600, QoS coverage data is defined for a bounded service area and group of users. At 602, mobile handsets of the users transmit (e.g., periodically) handset information (e.g., lat-long, SIM data, user ID data, preferences data, . . . ) to the network. At 604, each of the mobile users is then classified as being an in-coverage user or out-of-coverage user based on the mapping of the handset information (and related subscriber data) to qualifying service area data. For those users that successfully map to the service area data (by the corresponding user now carrying the handset within the service area), the premium service is allowed to be received on their handsets. Accordingly, in addition to the lat-long data, other information can be required to ultimately who, or what handsets, in the bounded premium service area will receive the premium service.

Figure 7:
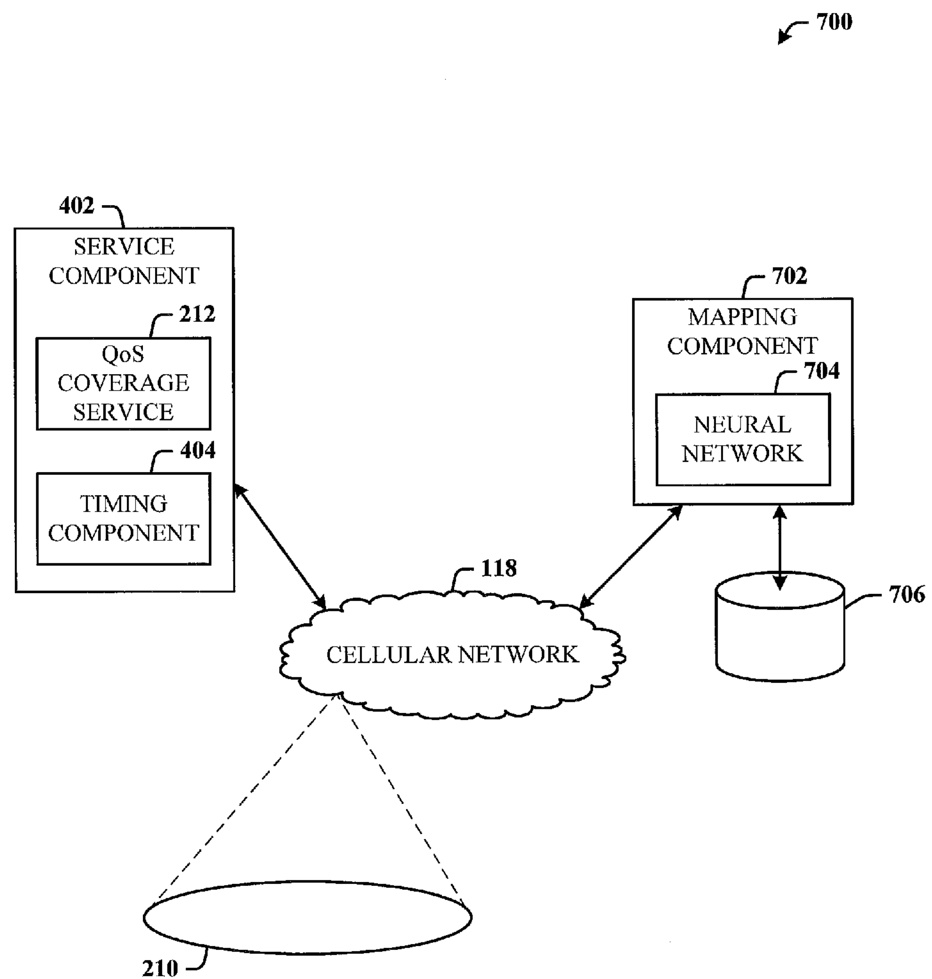
FIG. 7 illustrates an alternative implementation for managing the coverage-based QoS using a neural network.

Referring now to FIG. 7, there is illustrated an alternative implementation for managing the coverage-based QoS using a neural network. As before, the duration of the coverage-based QoS can be managed using the service component 402 and the timing component 404 that controls the duration of the service 212 over the coverage area 210.

In this implementation, a mapping component 702 includes a neural network 704 for more quickly processing handset geolocation data to determine if the handset qualifies for premium services. The neural network can be trained with sets of parameters of equations stored in a database 706 that map the bounded QoS coverage area until a qualifying value (e.g., a mean square error) is reached. The final trained parameters are then used as sets of equations, for example. User inputs can be latitude and longitude, and the output will be the classification of in-coverage or out-of-coverage users. The neural network mapping equation approach can provide faster classification of users that qualify for the QoS coverage than the common database search and lookup method. It is also to be understood that the functions of the timing component 404 and the mapping component 702 can be performed in combination, as desired.

It is also to be appreciated that coverage of the premium service area can be managed in other ways. For example, premium coverage can be controlled based on the number of handsets (or users) that enter the service area. In other words, the premium service is not enabled until the network senses that a minimum number of qualifying handsets have entered the bounded area and meet minimum requirements for receiving the premium service(s).

In yet another implementation, the premium service can be disabled based on a maximum number of qualifying handsets. If the maximum number is exceeded, service in that area is reduced or disabled entirely, until such time as the maximum number is no longer exceeded, and the premium service is re-enabled to the service area.

As can be seen, the flexibility that accompanies the disclosed architecture provides many different ways for modifying or enhancing coverage-based QoS.

Figure 8:
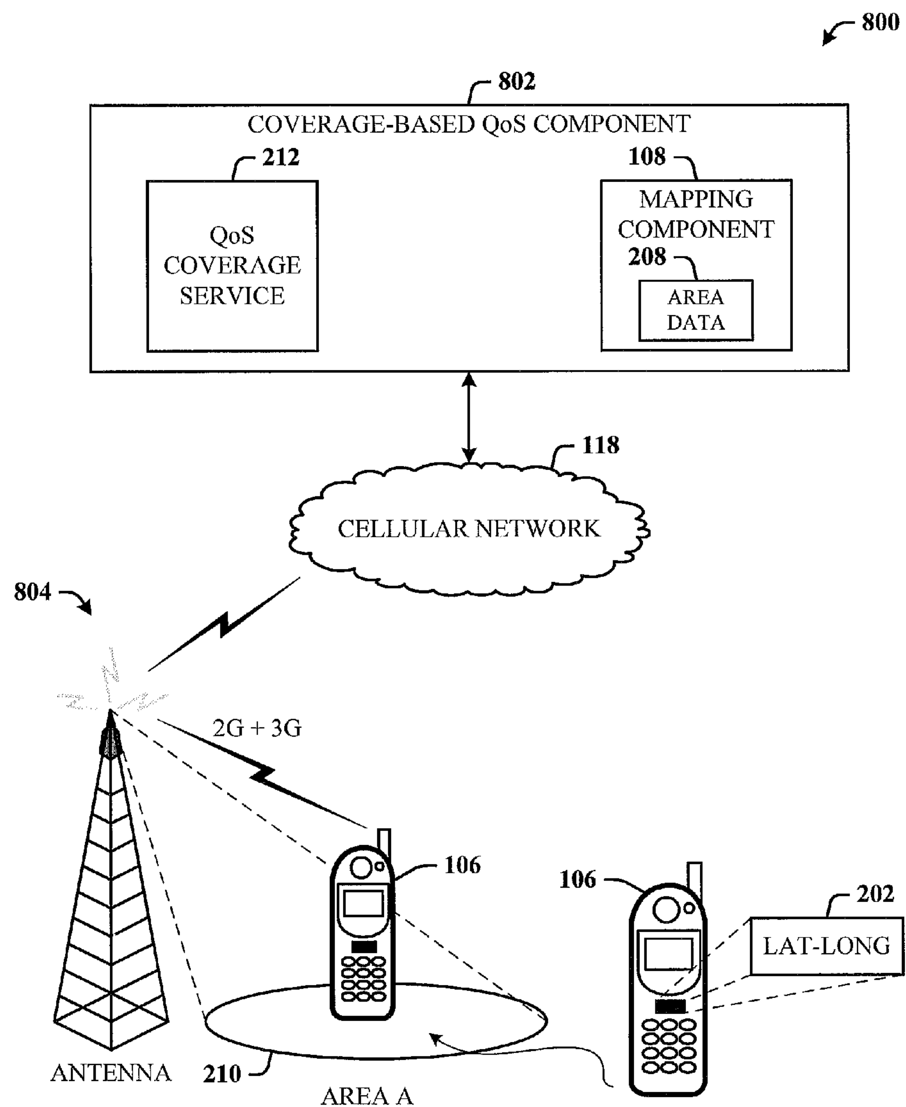
FIG. 8 illustrates an alternative implementation where smart antenna technology is employed in combination with coverage-based QoS.

FIG. 8 illustrates an alternative implementation 800 where smart antenna technology is employed in combination with coverage-based QoS. Smart antennas can provide greater capacity and performance benefits than standard antennas, since they can be employed to customize and fine-tune antenna coverage patterns. Smart antennas provide flexibility by enabling wireless network operators to change antenna patterns to adjust to the conditions desired (e.g., changing traffic or RF conditions in the network). Moreover, smart antennas can provide greater control in 3-D space. Beam forming can be employed in smart antennas to create radiation patterns in an antenna array by adding or nulling the phases of the signals in the direction of the desired bounded coverage area for corresponding qualified premium service handsets or for undesired or unqualified handsets. Means for implementing and controlling smart antennas are well-known in the art.

In support of combining the innovative coverage-based QoS described herein to smart antenna systems, the system 800 can include a coverage based QoS component 802 that includes functionality for providing the premium service 212 and the mapping component 108 for performing a mapping function by mapping the lat-long data 202 of the handset 106 to the area data 208 (or processing the data 202 through a neural network).

The system 800 includes a smart antenna system 804 that can provide both 2G ad 3G services as facilitated by the coverage-based component 802 for communication over the cellular network 118. The smart antenna 804 provides coverage for the coverage area 210, as well as for services outside of the area 210. As before, movement of the handset 106 into and out of the coverage area 210 facilitates receiving and not receiving the premium service, respectively, over corresponding 3G and 2G networks. Other functionality described above with respect to timing control, triggers, and access control to coverage data applies equally well in this system 800.

Figure 9:
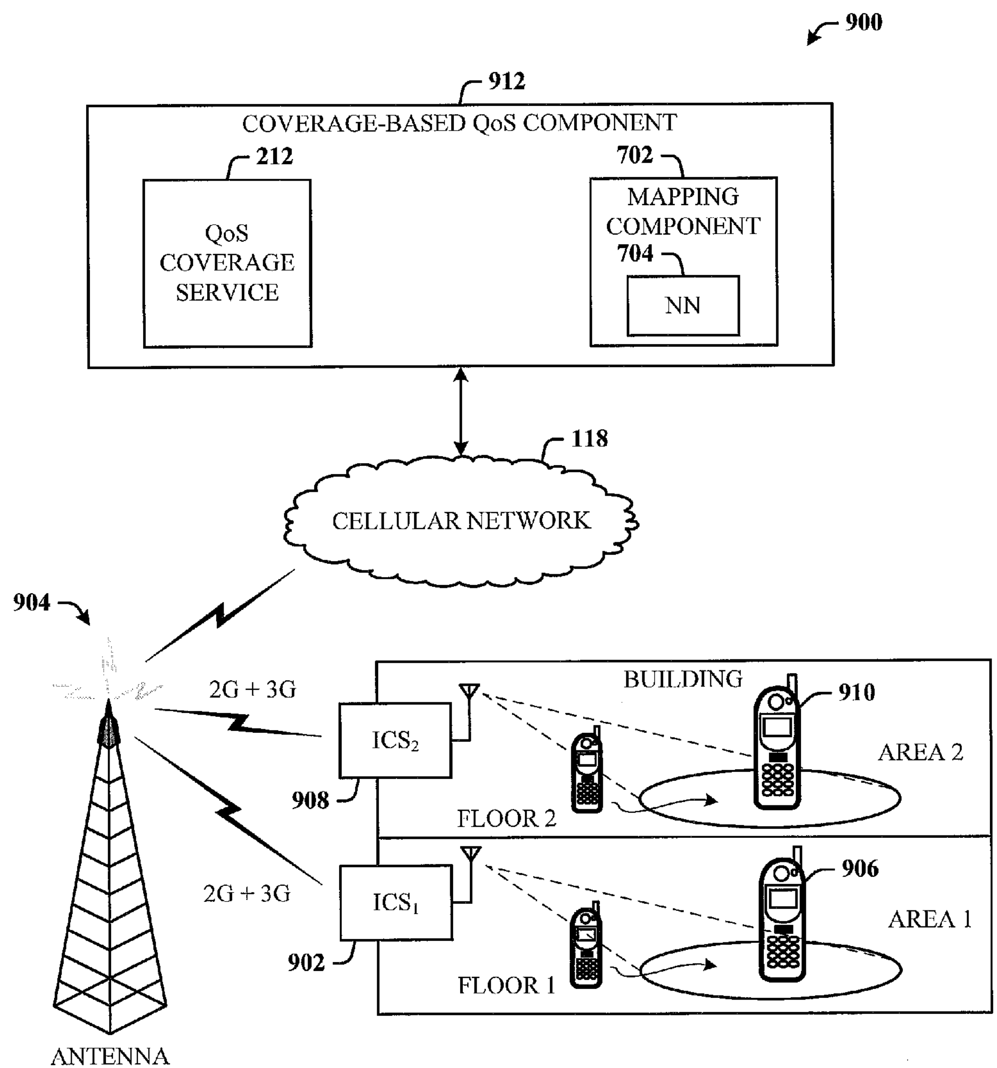
FIG. 9 illustrates an alternative system that employs micro-cell management of coverage-based QoS.

FIG. 9 illustrates an alternative system 900 that employs microcell management of coverage-based QoS. This system 900 facilitates microcell coverage control at different levels and locations, for example, using a network extension system referred to as an intermediate communications system (ICS). This coverage-based QoS can be provided over smaller areas at different floors, for example. Here, a first ICS 902 (denoted $ICS_1$) is strategically positioned on a first floor (e.g., FLOOR 1) of a building 904. It is understood that the first ICS 902 can be utilized in a smaller bounded area such as a room on the first floor, for example. In any case, the first ICS 902 facilitates communication between handsets (e.g., a first handset 906) on the first floor and the cellular network 118 via the cell site antenna 904. Thus, by defining a first bounded area (AREA 1) on the first floor, the coverage-based QoS technology can be applied on a smaller scale. Accordingly, as the user moves the handset 906 from an out-of-coverage area (outside AREA 1) to the in-coverage area (inside AREA 1), the handset 906 can then receive the premium service while on the first floor in AREA 1. Location of the first handset 906 can be computed using A-GPS and/or triangulation techniques based on signal power, for example. When the first handset is outside of the AREA 1, the cellular system can deny premium service, which then uses the default 2G services.

Similarly, a second ICS 908 (denoted $ICS_2$) is strategically positioned in a location of a second floor (e.g., FLOOR 2) of the building 904. It is understood that the second ICS 908 can be utilized in a smaller bounded area such as a room on the second floor, for example. The second ICS 908 facilitates communication between handsets (e.g., a second handset 910) on the first floor and the cellular network 118 via the cell site antenna 904. Thus, by defining a second bounded area (AREA 2) on the second floor, the coverage-based QoS technology can be applied on a smaller scale. Accordingly, as the user moves the second handset 910 from an out-of-coverage area (outside AREA 2) to the in-coverage area (inside AREA 2), the handset 910 can then receive the premium service while on the second floor in AREA 2. Location of the second handset 910 can be computed using A-GPS and/or triangulation techniques based on signal power, for example. When the second handset 910 is outside of the AREA 2, the cellular system can deny premium service, which uses the default 2G services.

The system 900 can employ a coverage based QoS component 912 to facilitate coverage-base management of the microcell areas. The component 912 can include the QoS coverage service component 212 and the mapping component 702 and accompanying neural network (NN) 704 for faster processing in the microcell scenario.

Figure 10:
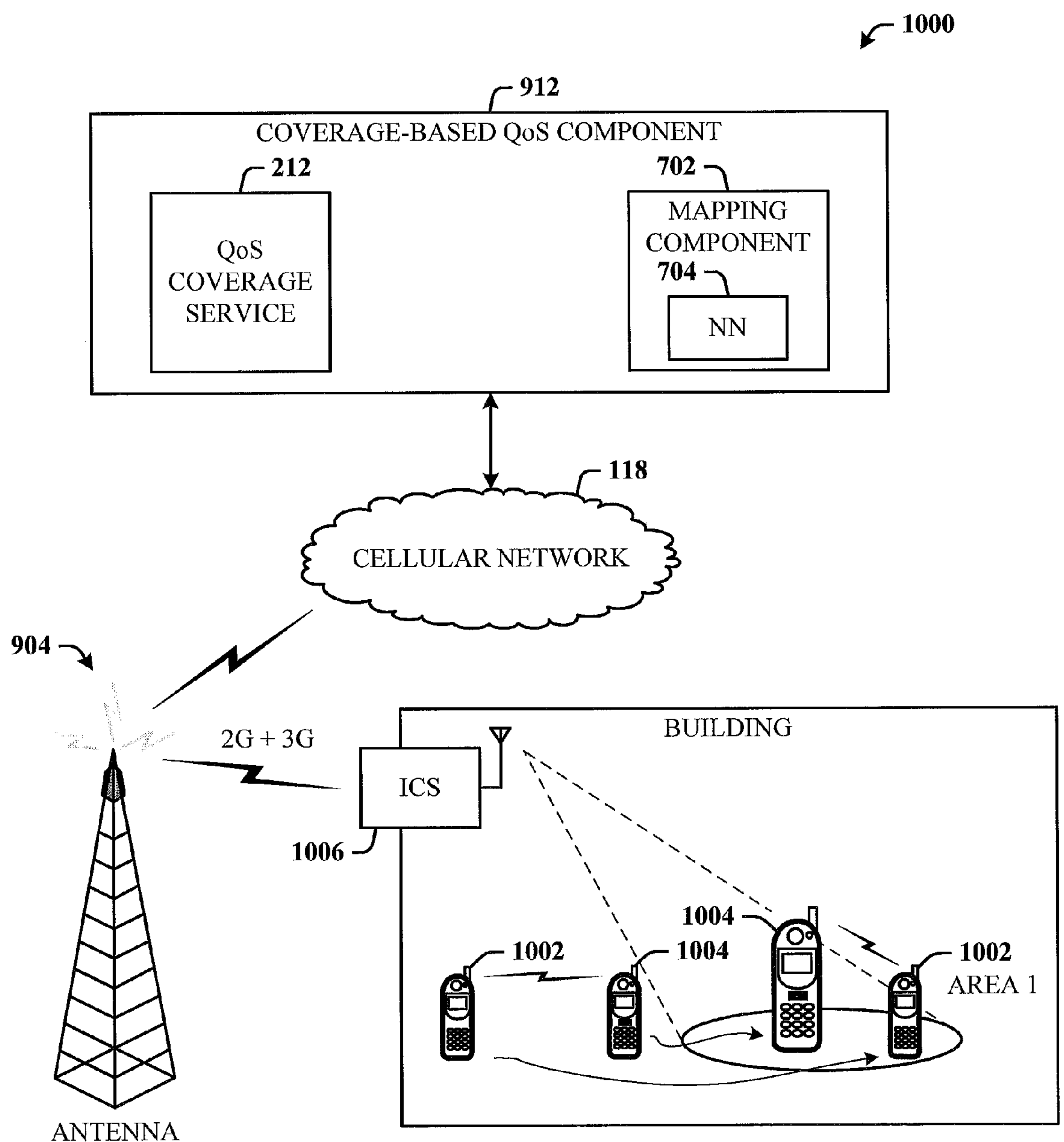
FIG. 10 illustrates an alternative coverage-based QoS system using qualification by proxy.

FIG. 10 illustrates an alternative coverage-based QoS system 1000 using qualification by proxy. Here, a first handset 1002 may not have suitable capabilities for becoming qualified for receiving the premium services, yet it is desired that such a user should be. Accordingly, if the first handset 1002 includes a short range RF communications capability such as Bluetooth, WiFi, WiMax, or other related technologies, and a second handset 1004 does as well, it can be possible for the second handset 1004 to receive information from the first handset 1002 which when communicated by the second handset 1004 to the cellular network 118, will allow the first handset 1002 to receive the premium service once it moves into the premium coverage area (AREA 1). An ICS 1006 provides the capabilities described above by handling communications between the building interior and the cellular network 118 and its services. Note that the cellular network 118 as described herein can provide all the services provided by both 2G and 3G networks. The antenna 904, coverage-based component 912, service 212, mapping component 702 and NN 704 provide functionality similar to what has been described above in association with these entities.

An additional alternative coverage-based QoS system can incorporate short-range radio beacons to define the bounded area. For example, Bluetooth transmitters can be placed in the bounded area such that they are received by Bluetooth capable handsets which are within the transmitter range of the beacons. The reception of the Bluetooth signal can indicate that the handset is in the enhanced QoS area. The handset can indicate to the network that the Bluetooth signal has been received to obtain the enhanced QoS. In order to prevent spoofing and other attempts to improperly receive enhanced QoS, the Bluetooth beacons can be configured to transmit a key which can be used to authenticate a handset's reception of the Bluetooth signal. Such a key can be changed periodically in order to insure that the handset is currently in the QoS area. Other short range radio technologies known in the art can be used to implement such a system.

As used in this application, the terms "component" and "system" are intended to refer to hardware, a combination of hardware and software, software, or software in execution in both IP networks and cellular networks. For example, a component can be, but is not limited to being, a process running on a processor, a processor, a hard disk drive, multiple storage drives (of optical and/or magnetic storage medium), an object, an executable, a thread of execution, a program, cellular routing system, service, and/or a computer or mobile terminal (cell phone).

Figure 11:
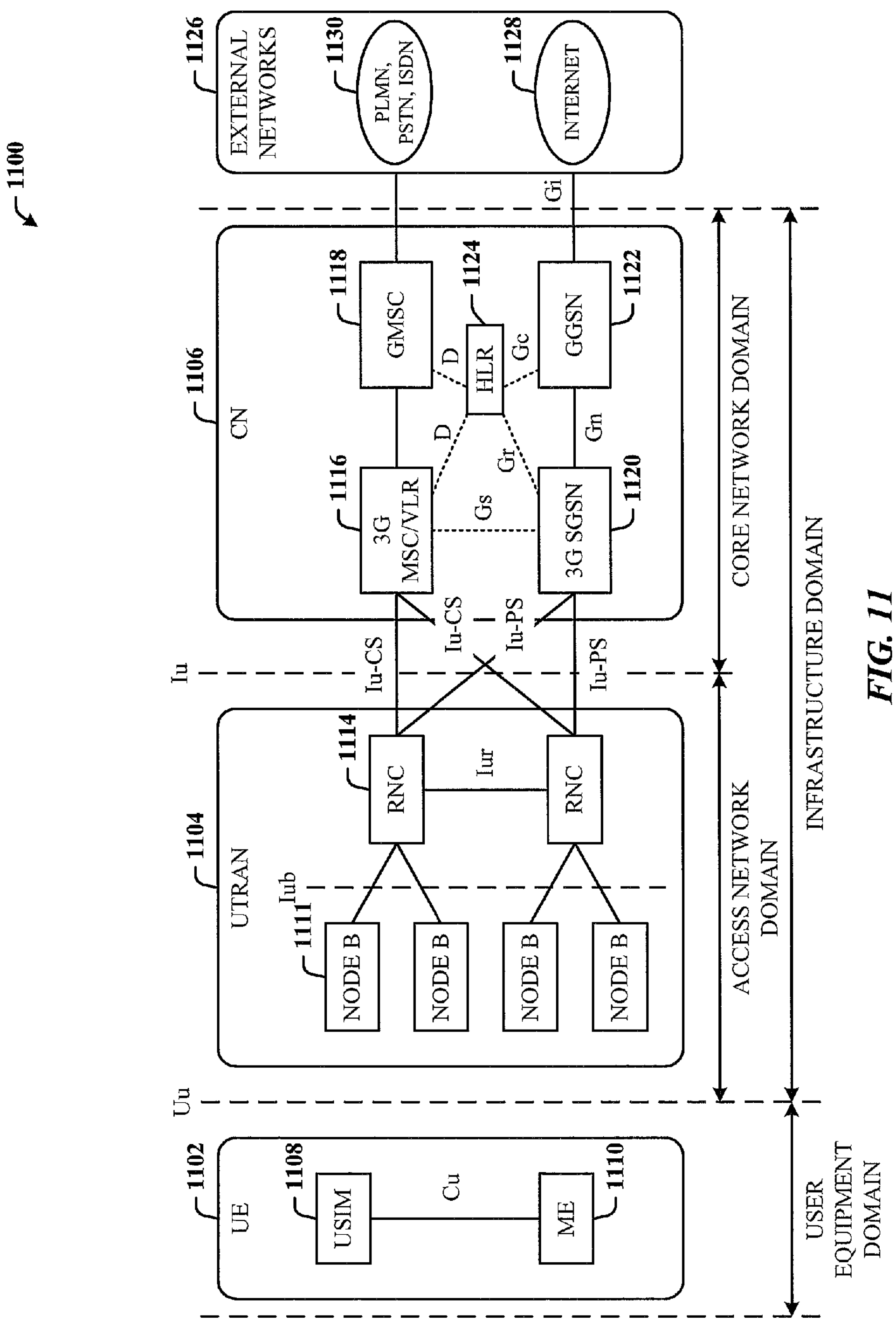
FIG. 11 illustrates an exemplary UMTS network that facilitates coverage-based QoS in accordance with the subject innovation.

FIG. 11 illustrates an exemplary UMTS network 1100 that facilitates coverage-based QoS in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. UMTS can be used in other cellular/PCS frequencies, for example, 825-849 MHz and 869-894 MHz, 1850-1910 MHz and 1930-1990 MHz. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 1100 can consist of three interacting domains; a user equipment (UE) domain 1102, a UMTS Terrestrial Radio Access Network (UTRAN) domain 1104, and a core network (CN) domain 1106. The UTRAN domain 1104 is also referred to as the access network domain and the CN 1106 is referred to as the core network domain, the both of which comprise an infrastructure domain.

The UE domain 1102 includes a USIM (user services identity module) domain and an ME (mobile equipment) domain. User equipment is the equipment used by the user to access UMTS services. In the UE domain 1102, the UMTS IC card is the USIM 1108 which has the same physical characteristics as GSM SIM (subscriber identity module) card. The USIM interfaces to ME 1110 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 1104 provides the air interface access method for the UE domain 1102. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 1112, and control equipment for Node-B devices is called a radio network controller (RNC) 1114. The interface between the Node-B device and the RNC 1114 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 1116 and gateway MSC (GMSC) 1118. Packet-switched elements include a serving GPRS support node (SGSN) 1120 and gateway GPRS support node (GGSN) 1122. Some network elements such as an EIR (equipment identity register) (not shown), HLR (home location register) 1124, VLR and AuC (authentication center) (not shown) can be shared by both domains.

A function of the CN 1102 is to provide switching, routing and transit for user traffic. The CN 1102 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 1106 interfaces to the radio access domain via an Iu interface. An Iu-CS (circuit-switched) reference point interfaces an RNC of the access network to the MSC/VLR entity 1116 of the CN 1106 for voice from/to the MSC/VLR 1116. An Iu-PS (packet-switched) reference point interfaces an RNC of the access network to the SGSN entity 1120 of the CN 1106 for data from/to the SGSN 1120.

In the CN 1106, a Gs interface is provided between the MSC/VLR 1116 and the SGSN. A Gn interface is provided between the SGSN 1120 and the GGSN 1122. A D interface is provided between the MSC/VLR 1116 and the HLR 1124, and the HLR 1124 and the GMSC 1118. A Gr interface is provided between the SGSN 1120 and the HLR 1124. A Gc interface is provided between the GGSN 1122 and the HLR 1124.

The CN 1106 provides the interface from the UE domain 1102 to external networks 1126 such as the Internet 1128 via a Gi interface from the GGSN 1122, and other networks 1130 via the GMSC 1118, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 1106 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz can be utilized for TDD and TD/CDMA. Unpaired channel spacing can be 5 MHz and raster is 200 kHz. Transmit and receive are not separated in frequency. Frequencies such as 1980-2010 MHz and 2170-2200 MHz can be employed for satellite uplink and downlink.

The disclosed invention finds application to EDGE (Enhanced Data rates for GSM Evolution) technology. EDGE is effectively the final stage in the evolution of the GSM standard, and uses a new modulation schema to enable theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates coverage-based mobile communications, the system comprising:

a tangible, non-transient storage component storing coverage data associated with a bounded premium service area;

a mapping component of a wireless network, the mapping component being configured to:

receive first geolocation data indicating a location of a mobile communications device;

map the first geolocation data to the coverage data associated with the bounded premium service area, the coverage data comprising second geolocation data that defines geolocation boundaries of the bounded premium service area; and determine if the mobile communications device is within the geolocation boundaries of the bounded premium service area by comparing the first geolocation data to the coverage data; and a service component of the wireless network configured to facilitate communication of communications signals at a premium quality-of-service (QoS) level to the bounded premium service area, wherein:

the service component determines that the mobile communications device is entitled to receive communications signals at the premium QoS level only in response to the mapping component determining that the mobile communications device is within the geolocation boundaries of the bounded premium service area; and the service component disables provision of communication signals to the mobile communications device at the premium QoS level in response to a determination that a maximum number of qualifying handsets is present within the geolocation boundaries of the bounded premium service area.

2. The system of claim 1, further comprising a timing component defining a predetermined lapse time period associated with the bounded service area, wherein the lapse time period includes hours, days, or weeks.

3. The system of claim 1, further comprising an access component that disables, by denying access to the coverage data, communications, to the bounded premium service area, of the communications signals at the premium QoS level.

4. The system of claim 1, further comprising an access component that controls, by denying mapping of the first geolocation data to the coverage data, reception of the communications signals at the premium QoS level by the mobile communications device.

5. The system of claim 1, wherein the service component communicates at the premium QoS level by enabling UMTS network access by the mobile communications device in the bounded premium service area.

6. The system of claim 5, wherein the service component provides a mobile communications device within the bounded premium service area with UMTS network access to support live video share.

7. The system of claim 5, wherein the service component provides a mobile communications device within the bounded premium service area with UMTS network access to support online gaming.

8. The system of claim 1, wherein the first geolocation data comprises lat-long data transmitted from the mobile communications device to the wireless network for mapping by the mapping component to the coverage data.

9. The system of claim 1, wherein the first geolocation data comprises data computed based upon a triangulation technology that triangulates location of the mobile communications device.

10. The system of claim 1, wherein the geolocation data comprises data computed based on signal power of the mobile communications device.

* * * * *